United States Patent
Petrsorich

(10) Patent No.: US 6,886,431 B1
(45) Date of Patent: May 3, 2005

(54) COMBINATION SCREW DRIVER BLADE TIP AND COOPERATING INTERLOCKING SCREW SLOT

(76) Inventor: Anthony Petrsorich, 143 Malts Ave., West Islip, NY (US) 11795

( * ) Notice: Subject to any disclaimer, the term of this patent is extended or adjusted under 35 U.S.C. 154(b) by 0 days.

(21) Appl. No.: 10/244,277

(22) Filed: Sep. 16, 2002

(51) Int. Cl.[7] ............................................. B25B 23/10
(52) U.S. Cl. ........................................... 81/436; 81/451
(58) Field of Search .................. 81/436, 438, 441, 81/451; D8/86

(56) References Cited

U.S. PATENT DOCUMENTS

| | | | |
|---|---|---|---|
| 1,184,173 A | 5/1916 | Gehring | |
| 1,296,165 A | 3/1919 | Costuma | |
| 1,548,297 A | 8/1925 | Wintrob | |
| 1,677,607 A | 7/1928 | Wood | |
| 1,797,390 A | 3/1931 | Wood | |
| 1,997,422 A | 4/1935 | Lorenzen et al. | |
| 2,431,628 A | * 11/1947 | Waarich | 81/436 |
| 2,567,466 A | * 9/1951 | Bartlett | 81/436 |
| 3,175,593 A | * 3/1965 | Launay | 81/436 |
| 3,695,321 A | 10/1972 | Garehime, Jr. | |
| 3,891,017 A | * 6/1975 | Iskra | 81/436 |
| 3,985,170 A | * 10/1976 | Iskra | 81/438 |
| 4,016,912 A | 4/1977 | St-Amour | |
| 4,130,152 A | 12/1978 | Bolen | |
| 4,190,091 A | * 2/1980 | Colognori | 81/436 |
| 4,325,153 A | * 4/1982 | Finnegan | 81/438 |
| 4,339,971 A | 7/1982 | Zatorre | |
| 4,434,687 A | * 3/1984 | Vickio | 81/441 |
| 4,572,039 A | 2/1986 | Desjardins | |
| 4,911,593 A | 3/1990 | Kephart | |
| 4,936,172 A | 6/1990 | Jackson | |
| 5,353,667 A | 10/1994 | Wilner | |
| D371,946 S | * 7/1996 | Giblin | D8/82 |
| 5,582,548 A | 12/1996 | Czegledi | |
| 5,722,838 A | 3/1998 | Czegledi | |
| D405,672 S | * 2/1999 | Wirths | D8/86 |
| D438,774 S | * 3/2001 | Huang et al. | D8/86 |
| D480,618 S | 10/2003 | Petrsorich | |

* cited by examiner

*Primary Examiner*—Hadi Shakeri
(74) *Attorney, Agent, or Firm*—Collard & Roe, P.C.

(57) ABSTRACT

A screw has a head releasably engaged by a flat blade tip in such a manner so as to prevent the flat blade tip from sliding off of the head of the screw as the flat blade up tip drives the screw. The head of the screw has a blind slot defined by a pair of walls and which extends diametrically and completely thereacross, and a blind bore extending concentrically therein. The diameter of the blind bore is less than the width of the blind slot preventing damage to, or breakage of, a drill bit used to drill the blind bore during manufacture by preventing the drill bit from hitting the pair of walls during drilling. The flat blade tip has a projection depending centrally therefrom that is coplanar with, and is a continuation of, the flat blade tip so as to allow the projection to be readily formed by merely removing material from the flat blade tip.

1 Claim, 4 Drawing Sheets

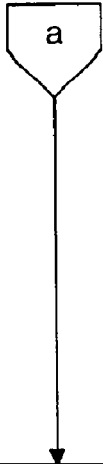

DRILL THE BLIND BORE (24) CONCENTRICALLY IN THE FLOOR (19) OF THE BLIND SLOT (18) IN THE HEAD (16) OF THE SCREW (12) WITH THE DIAMETER (26) THEREOF BEING LESS THAN THE WIDTH OF THE BLIND SLOT (18) IN THE HEAD (16) OF THE SCREW (12) FOR PREVENTING DAMAGE TO, OR BREAKAGE OF, A DRILL BIT UTILIZED TO DRILL THE BLIND BORE (24) IN THE HEAD (16) OF THE SCREW (12) BY PREVENTING THE DRILL FROM CONTACTING THE PAIR OF WALLS (20) OF THE BLIND SLOT (18) IN THE HEAD (16) OF THE SCREW (12) DURING DRILLING

STEP 2

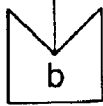

FIG. 5B

COMBINATION SCREW DRIVER BLADE TIP AND COOPERATING INTERLOCKING SCREW SLOT

BACKGROUND OF THE INVENTION

1. Field of the Invention

The present invention relates to a fastener. More particularly, the present invention relates to a fastener and driver therefor.

2. Description of the Prior Art

Numerous innovations for screw related devices have been provided in the prior art that will be described. Even though these innovations may be suitable for the specific individual purposes to which they address, however, they differ from the present invention.

A FIRST EXAMPLE, U.S. Pat. No. 1,842,173 to Gehring teaches a wood screw comprising a threaded shank having a circular head with a flat outer end, said head being formed with a pair of cylindrical bores of equal diameter throughout their lengths lying parallel to the axis of the shank and opening through the inner and outer ends of said head, the innermost sides of the bores lying flush with the exterior of the shank, said bores being adapted to receive a pair of projecting pins on a screw driver for driving or removing the screw, and to receive locking pins.

A SECOND EXAMPLE, U.S. Pat. No. 1,296,165 to Costuma teaches a part provided with a socket, a screw provided with a head located within said socket, said screw head being provided with a slot whose walls diverge downwardly, and a body of readily molded material in contact with the screw head and the wall of said socket and extending into and filling said slot from wall to wall, to form a permanent lock for said material and the screw.

A THIRD EXAMPLE, U.S. Pat. No. 1,548,297 to Wintrob teaches a locking device for thumb nuts comprising in combination, a thumb nut having a central threaded bore whereby the same may be screwed upon a bolt and further provided with a pair of holes parallel with the bore, each of said holes being of two different diameters, said thumb nut including an externally threaded boss portion, a cap having threaded engagement with said boss portion and rods actuated by the movements of said cap and passing through the holes in the thumb nut, said rods having enlarged head portions adapted to be projected from the large portions of the holes as the cap is threaded onto the thumb nut.

A FOURTH EXAMPLE, U.S. Pat. No. 1,677,607 to Wood teaches a staple for use in connection with a standard screw head with the usual cross slot and under cut periphery, comprising a head adapted to fit snugly into the cross slot, and prongs extending at an angle therefrom through the ends of said slot, each of said prongs having a hump on one side, and said head forming a projection on the opposite side, the projection forcing the hump into engagement with the undercut wall of the screw head.

A FIFTH EXAMPLE, U.S. Pat. No. 1,797,390 to Wood teaches a screw driver, the broad sides of its blade tapered longitudinally downward toward its working edge, comprising in combination a cylindrical key centered on the working edge of said blade and extending longitudinally with the blade above and below the said working edge, the portion of the blade fitting into the key of a screw being slightly tapered laterally from its center to its lateral edge.

A SIXTH EXAMPLE, U.S. Pat. No. 1,997,422 to Lorenzen et al. teaches a screw provided across an end face thereof with a slot divergently tapering from said face inwardly of the screw and from adjacent the center of said face towards the outer sides thereof to define a cavity wedge-shaped in cross section longitudinally of the screw and a widening of the slot from the center of said face to the opposite side edges of the slot, the bottom of the slot being of uniform width throughout its length the width of said slot at said side edge being substantially the same as the extreme width of the base of said cavity, and to be used with a driver having an end portion convergently tapered from the end face thereof and arranged to fit in said cavity, said driver end face being of a width substantially the same as the cavity base and edge slot widths aforesaid and being arcuately convex in the longitudinal plane of the driver to permit removal of said driver face from one of the side edges of the slot upon arcuate displacement the driver relative to the screw and about substantially the center of curvature of said driver end face.

A SEVENTH EXAMPLE, U.S. Pat. No. 3,695,321 to Garehime, Jr. teaches an upper surface of the head of a screw having wedge-shaped cavities arranged on either side of, or around, a central hub or land. The cavities have undercut sidewalls, and the land has a central hole, preferably circular. A driving tool such as a screwdriver, or the like, is provided with multiple blades which are spaced apart on either side of or around a central aperture. A central pin depends from the shank of the screwdriver and is adapted to engage the hole in the central land of the screw. The bottoms of the screwdriver blades are of expanded thickness so that when these blades are inserted in and engage the screwhead cavities, the expanded bottom portions of the blades will lock under the undercut sidewalls of the cavities. Mating of the screwdriver blades and the screw head cavities is guided, aligned and axially stabilized by engagement of the screwdriver central pin in the hole in the central land of the screwhead surface. Expandable pin sections maintained under tension may be employed to temporarily lock a screw onto the screwdriver blades and held in positive axial alignment with said screwdriver for insertion and withdrawal.

AN EIGHTH EXAMPLE, U.S. Pat. No. 4,016,912 to St-Amour teaches a screwdriver of the type adapted to drive a slotted head screw and which is particularly adapted to firmly engage in a dull or deformed slot of such screw to drive the latter. This screwdriver includes a shank formed at one end with a head having a strikable end face and at the other end with a screw driving bit including a blade having a transverse outer edge, opposite side edges extending along the blade lengthwise of the shank, and protuberances on opposite sides of the blade at the opposite side edges thereof and extending lengthwise of the shank outwardly coextensive with the transverse edge to engage with the latter in a dull or deformed slot of a slotted head screw.

A NINTH EXAMPLE, U.S. Pat. No. 4,130,152 to Bolan teaches a head of a fastener provided with an inverted T-slot which is engagable by the T-shaped end of a driver for precluding the accidental or unintentional disengagement of the driver from the fastener-head during insertion or removal thereof.

A TENTH EXAMPLE, U.S. Pat. No. 4,339,971 to Zatorre teaches a driving tool and fastener, in the driving end of which is provided a nick or slot for insertion of the driving tool for driving the fastener, are provided which, because of their particular, respective cross-sectional configurations, can be interlocked temporarily together. As this interlocking engagement prevents the driving tool from accidentally slipping from the nick in the driving end of the fastener, rotational movement of the fastener is greatly facilitated.

The shank of the driving tool is provided at its operative end with a bit that, because of its cross-sectional configuration compared to that of the nick, wedges with the nick. Thus, not only is slipping between the driving tool and fastener prevented when rotating the fastener, but accidental separation of the driving tool from the fastener is prevented, making the task considerably easier when using the fastener in overhead work or in a hard to reach location.

AN ELEVENTH EXAMPLE, U.S. Pat. No. 4,572,039 to Deejardins teaches an interlocking lock screw and screwdriver which prevents the specially designed screwdriver blade with guide dimples from slipping out of a specially designed screw head with a screwdriver guide channel and guide dimple entry apertures. The screwdriver may be used in any position including sideways and directly overhead. A rotational locking system is provided which allows a user to drive a staple or brad through the screw head locking it in place or a decorative locking cap may be used. A decorative non-locking cap is also provided which is easy to install yet easily stays in place.

A TWELFTH EXAMPLE, U.S. Pat. No. 4,911,593 to Kephart teaches a threaded fastener organization wherein an axially threaded shank includes an enlarged overlying head wherein the head is provided with a square prismatic recess formed through an upper surface of the head and wherein the recess is formed with planar walls, each aligned parallel to the axis of the threaded shank. Each wall includes a semispherical recess for reception and engagement with a detect sphere associated in a conventional ratchet driver.

A THIRTEENTH EXAMPLE, U.S. Pat. No. 4,936,172 to Jackson teaches a screwdriver and mating screw with interlocking features for coupling with one another to facilitate driving the screw into a work piece. The screwdriver includes a handle and a blade with an engagement flange on the outer extremely of the blade. The engagement flange engages a complementary recess provided in the head of the mating screw, the recess including a downwardly facing shoulder. A coupling sleeve mounted on the blade exerts an axially directed force on the screw once the engagement flange and complementary recess are engaged to thereby interlock the screwdriver and mating screw.

A FOURTEENTH EXAMPLE, U.S. Pat. No. 5,353,667 to Wilner teaches a combination tool and fastener in which the fastener has a head portion and a threaded screw portion. An aperture is formed in the head portion. The aperture has a first portion of constant dimension recessed inwardly from the head portion. A second portion of the aperture is recessed an additional distance beyond the end of the first portion and is increased in dimension. The tool is provided with an engaging portion which is insertable through the first aperture portion and lockingly engageable within the second aperture portion so as to enable the tool to rotate the fastener in either direction.

A FIFTEENTH EXAMPLE, U.S. Pat. No. 5,582,548 to Czegledi teaches a fastener system that includes a fastener and a driver tool in which the fastener includes a cavity for insertion of the driver tool and in which the driver tool and the fastener form an interlocking relationship between the driver tool and the fastener is formed by having a portion of the fastener overlie a portion of the driver tool. This interlocking relationship prevents accidental separation of the driver tool from the fastener and consequent marring of the surfaces of the work pieces being joined together and also prevents stripping of the driver tool and the fastener cavity.

A SIXTEENTH EXAMPLE, U.S. Pat. No. 5,722,838 to Czegledi teaches a fastener system that includes a fastener and a driver tool in which the fastener includes a cavity for insertion of the driver tool and in which the driver tool and the fastener form an interlocking relationship between the driver tool and the fastener is formed by having a portion of the fastener overlie a portion of the driver tool. This interlocking relationship prevents accidental separation of the driver tool from the fastener and consequent marring of the surfaces of the work pieces being joined together and also prevents stripping of the driver tool and the fastener cavity.

It is apparent that numerous innovations for screw related devices have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

Accordingly, an object of the present invention is to provide a fastener and driver therefor that avoids the disadvantages of the prior art.

Another object of the present invention is to provide a fastener and driver therefor that is simple and inexpensive to manufacture.

Still another object of the present invention is to provide a fastener and driver therefor that is simple to use.

Briefly stated, still yet another object of the present invention is to provide a screw has a head releasably engaged by a flat blade tip in such a manner so as to prevent that flat blade tip from sliding off of the head of the screw as the flat blade tip drives the screw. The head of the screw has a blind slot defined by a pair of walls and which extends diametrically and completely thereacross and a blind bore extending concentrically therein. The diameter of the blind bore is less than the width of the blind slot preventing damage to, or breakage of, a drill bit used to drill the blind bore during manufacture by preventing the drill bit from hitting the pair of walls during drilling. The flat blade tip has a projection depending centrally therefrom that is coplanar with, and is a continuation of, the flat blade tip so as to allow the projection to be readily formed by merely removing material from the flat blade tip.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows:

FIGS. 5A–5C are a process flow chart for making the present invention.

Figure 1:
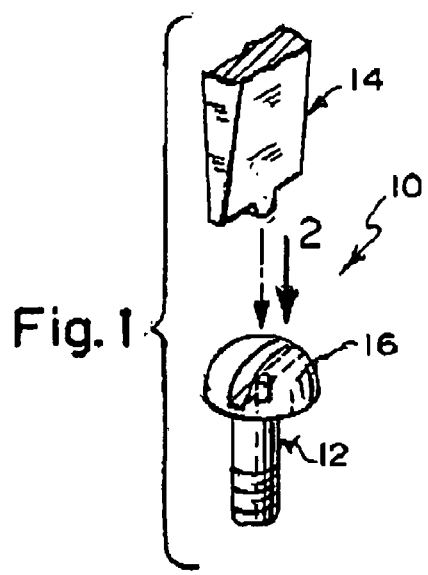
FIG. 1 is a diagrammatic perspective view of the present invention.

LIST OF REFERENCE NUMERALS UTILIZED IN THE DRAWING 10 fastener and driver therefor of present invention
12 screw
14 screw driver flat blade tip
16 head of screw 12
18 blind slot in head 16 of screw 12
19 floor defining blind slot 18 is head 16 of screw 12
20 pair of walls defining blind slot 18 in head 16 of screw 12
22 width of blind slot 18 in head 16 of screw 12
24 blind bore in head 16 of screw 12
26 diameter of blind bore 18 in head of screw 12
28 first pair of opposing surfaces forming screw driver flat blade tip 14
30 second pair of opposing surfaces forming screw driver flat blade tip 14
32 bottom surface forming screw driver flat blade tip 14
34 thickness of bottom surface 32 forming screw driver flat blade tip 14
36 projection of screw driver flat blade tip 14
38 first pair of opposing surfaces forming projection 36 of screw driver flat blade tip 14
40 second pair of opposing surfaces forming projection 36 of screw driver flat blade tip 14
42 free tip forming projection 36 of screw driver flat blade tip 14
44 four shoulders of projection 36 of screw driver flat blade tip 14

DETAILED DESCRIPTION OF THE PREFERRED EMBODIMENT

Referring now to the figures, in which like numerals indicate like parts, and particularly to FIG. 1, the fastener and driver therefor of the present invention is shown generally at 10.

The fastener and driver therefor 10 comprises a screw 12 and a screw driver flat blade tip 14. The screw 12 has a head 16 which is releasably engaged by the screw driver flat blade tip 14 in such a manner so as to prevent the screw driver flat blade tip 14 from sliding off of the head 16 of the screw 12 as the screw driver flat blade tip 14 drives the screw 12.

The specific configuration of the head 16 of the screw 12 can best be seen in FIG. 2, and as such, will be discussed with reference thereto.

The head 16 of the screw 12 has a blind slot 18. The blind slot 18 in the head 16 of the screw 12 extends diametrically and completely across the head 16 of the screw 12 and is defined by a floor 19 and a pair of walls 20 that are spaced-apart by a width 22.

The head 16 of the screw 12 further has a blind bore 24. The blind bore 18 in the head 16 of the screw 12 extends concentrically in the floor 19 of the blind slot 18 in the head 16 of the screw 12, between the pair of walls 20 of the blind slot 18 in the head 16 of the screw 12.

The blind bore 18 in the head 16 of the screw 12 has a diameter 26 that is less than the width 22 of the blind slot 18 in the head 16 of the screw 12 for preventing damage to, or breakage of, a drill bit (not shown) used to drill the blind bore 18 in the head 16 of the screw 12 during manufacture by preventing the drill bit (not shown) from hitting the pair of walls 20 of the blind slot 18 in the head 16 of the screw 12 during drilling.

Figure 4:
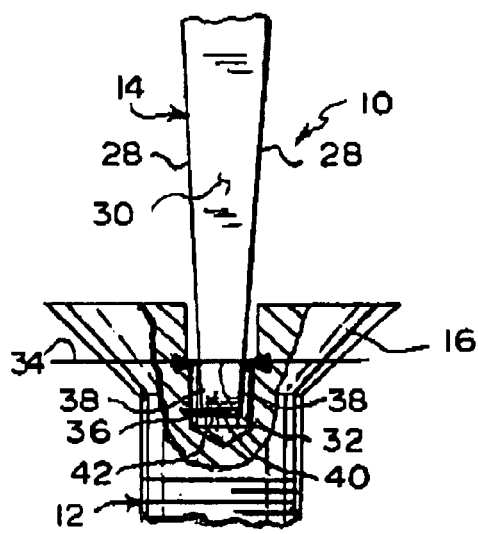
FIG. 4 is a diagrammatic side elevational view, with parts broken away, taken generally in the direction of arrow 4 in FIG. 3.

The specific configuration of the screw driver flat blade tip 14 and its releasable engagement with the head 16 of the screw 12 can best be seen in FIGS. 3 and 4, and as such, will be discussed with reference thereto.

The screw driver flat blade tip 14 is formed by a first pair of opposing surface 28, a second pair of opposing surfaces 30, and a bottom surface 32 having a thickness 34 and being rectangular-shaped. The first pair of opposing surfaces 28, the second pair of opposing surfaces 30, and the bottom surface 32 of the screw driver flat blade tip 14 are each flat.

The second pair of opposing surfaces 30 of the screw driver flat blade tip 14 do not taper towards the bottom surface 32 of the screw driver flat blade tip 14, whereas the first pair of opposing surfaces 28 of the screw driver flat blade tip 14 do taper towards the bottom surface 32 of the screw driver flat blade tip 14.

The thickness 34 of the bottom surface 32 of the screw driver flat blade tip 14 is less than the width of the blind slot 18 in the head 16 of the screw 12.

The thickness 34 of the bottom surface 32 of the screw driver flat blade tip 14 is less than the width 22 of the blind slot 18 in the head 16 of the screw 12 so as to prevent the screw driver flat blade tip 14 from sticking in the blind slot 18 in the head 16 of the screw 12 and to allow some play therebetween to prevent deforming the pair of walls 20 of the blind slot 18 in the head 16 of the screw 12 when the screw driver flat blade tip 14 drives the screw 12.

The screw driver flat blade tip 14 further has a projection 36. The projection 36 of the screw driver flat blade tip 14 depends centrally from the bottom surface 32 of the screw driver flat blade tip 14.

The projection 36 of the screw driver flat blade tip 14 is formed by a first pair of opposing surfaces 38, a second pair of opposing surfaces 40, and a free tip 42.

The first pair of opposing surfaces 38 and the second pair of opposing surfaces 40 of the projection 36 of the screw driver flat blade tip 14 are each flat.

The second pair of opposing surfaces 40 of the projection 36 of the screw driver flat blade tip 14 taper towards the free tip 42 of the projection 36 of the screw driver flat blade tip 14, whereas the first pair of opposing surfaces 38 of the projections 36 of the screw driver flat blade tip are coplanar with, and are continuations of, the first pair of opposing surfaces 28 of the screw driver flat blade tip 14, respectively, so as to allow the projection 36 of the screw driver flat blade tip 14 to be readily formed by merely removing material from the screw driver flat blade tip 14.

Figure 2:
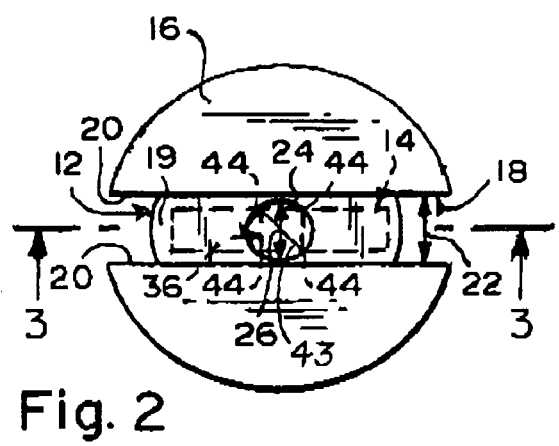
FIG. 2 is an enlarged diagrammatic top plan view taken generally in the direction of arrow 2 in FIG. 1.

The projection 36 of the screw driver flat blade tip 14 depends centrally from the bottom surface 32 of the screw driver flat blade tip 14 with a square lateral cross section having a diagonal 43 with a length, and as a result thereof, forms four shoulders 44 therewith (FIG. 2).

The blind bore 18 in the head 16 of the screw 12 has a circular lateral cross section (FIG. 2).

The length of the diagonal of the projection 36 of the screw driver flat blade tip 14 is equal to the diameter of the blind bore 18 in the head 16 of the screw 12 (FIG. 2).

Figure 3:
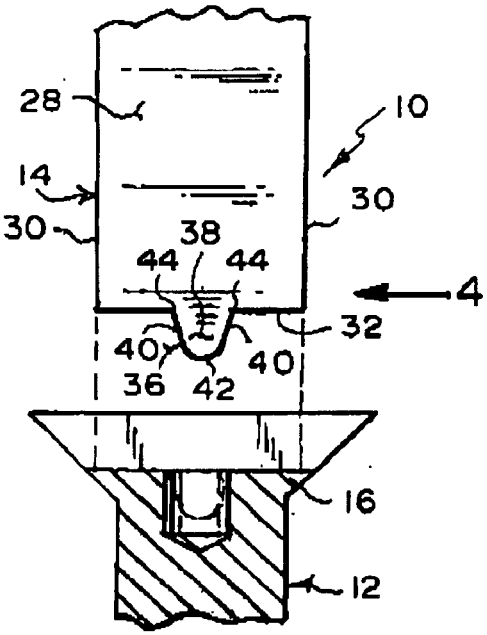
FIG. 3 is a diagrammatic cross sectional view taken along line 3—3 in FIG. 2.

The projection 36 of the screw driver flat blade tip 14 contacts the blind bore 24 in the head 16 of the screw 12 only at the four shoulders 44 of the projection 36 of the screw driver flat blade tip 14 so as to eliminate any possible binding between the screw driver flat blade tip 14 and the screw 12 by virtue of the length of the diagonal of the projection 36 of the screw driver flat blade tip 14 being equal to the diameter of the blind bore 24 in the head 16 of the screw 12 coupled with the second pair of opposing surfaces 40 of the projection 36 of the screw driver flat blade tip 14 tapering towards the free tip 42 of the projection 36 of the screw driver flat blade tip 14 (FIGS. 2 and 3).

Figure 5A:
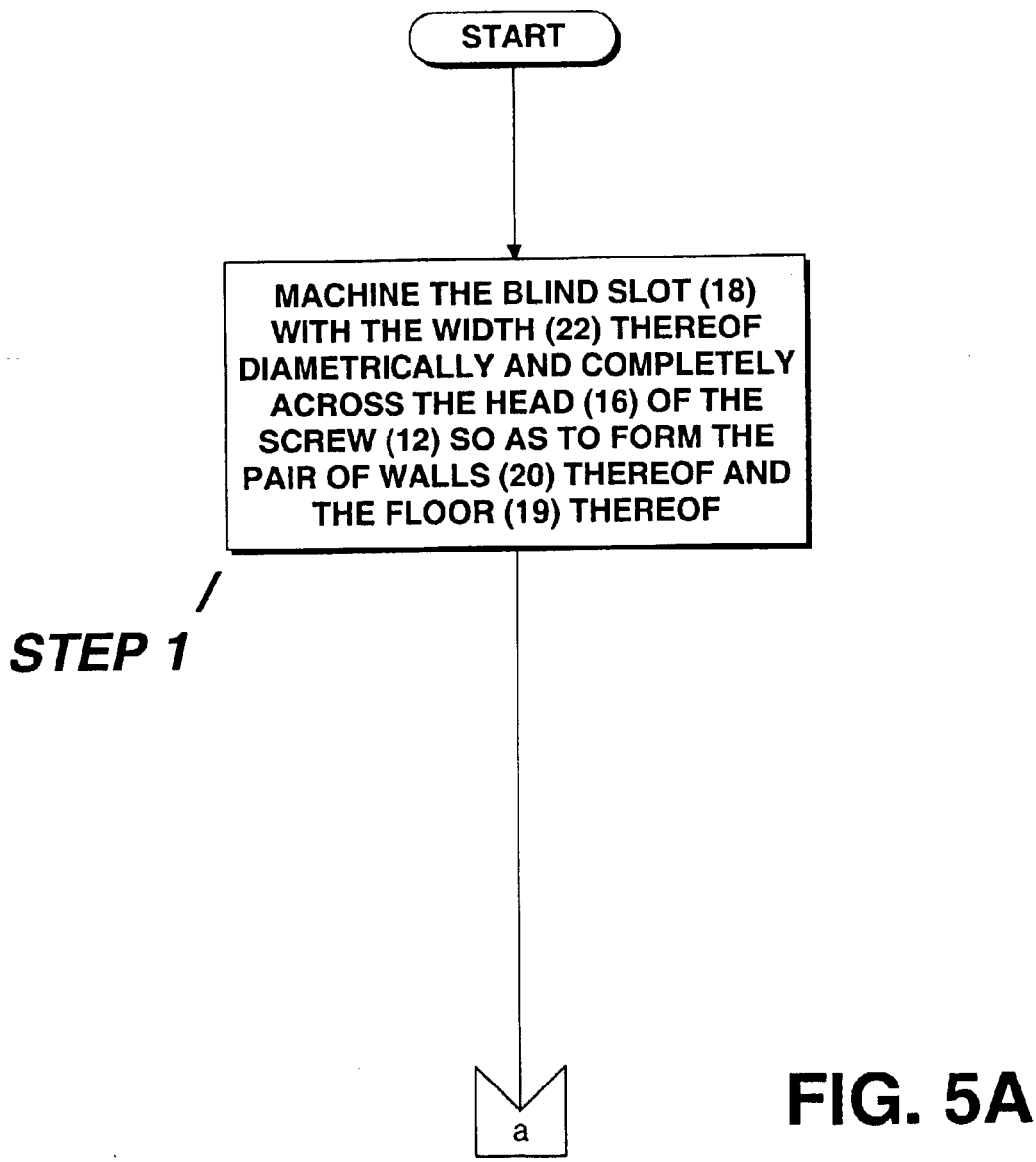
Figure 5C:
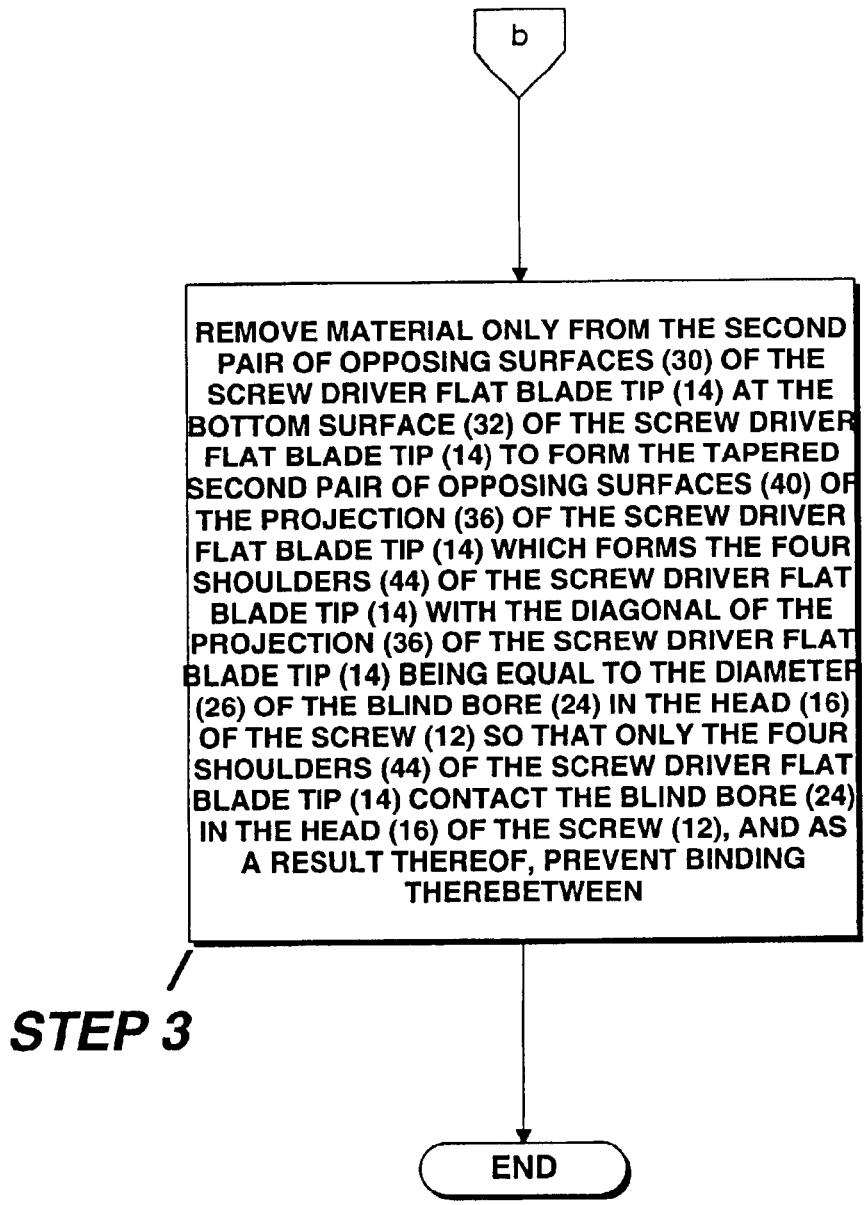

The method for making the fastener and driver therefor 10 can best be seen in FIGS. 5A–5C, and as such, will be discussed with reference thereto.

STEP 1: machine the blind slot 18 with the width 22 thereof diametrically and completely across the head 16 of the screw 12 so as to form the pair of walls 20 thereof and the floor 19 thereof.

STEP 2: Drill the blind bore 24 concentrically in the floor 19 of the blind slot 18 in the head 16 of the screw 12 with the diameter 26 thereof being less than the width of the blind slot 18 in the head 16 of the screw 12 for preventing damage to, or breakage of, a drill bit utilized to drill the blind bore 24 in the head 16 of the screw 12 by preventing the drill from contacting the pair of walls 20 of the blind slot 18 in the head 16 of the screw 12 during drilling.

STEP 3: Remove material only from the second pair of opposing surfaces 30 of the screw driver flat blade tip 14 at the bottom surface 32 of the screw driver flat blade tip 14 to form the tapered second pair of opposing surfaces 40 of the projection 36 of the screw driver flat blade tip 14 which forms the four shoulders 44 of the screw driver flat blade tip 14 with the diagonal of the projection 36 of the screw driver flat blade tip 14 being equal to the diameter 26 of the blind bore 24 in the head 16 of the screw 12 so that only the four shoulders 44 of the screw driver flat blade tip 14 contact the blind bore 24 in the head 16 of the screw 12, and as a result thereof, prevent binding therebetween.

It will be understood that each of the elements described above, or two or more together, may also find a useful application in other types of constructions differing from the types described above.

While the invention has been illustrated and described as embodied in a fastener and driver therefore, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A fastener in combination with a driver, comprising:

a) a screw comprising:
   i) a head;
   ii) a blind slot extending diametrically and completely across said head, said blind slot defined by a floor and a pair of substantially parallel spaced-apart walls separated by a substantially constant width; and
   iii) a blind bore drilled through said floor between said pair of substantially parallel spaced-apart walls and extending downwardly into said screw, said blind bore having a substantially circular lateral cross-section with a diameter less than said substantially constant width separating said pair of substantially parallel spaced-apart side walls; and b) a screw driver flat blade tip comprising:
   i) a rectangular-shaped bottom surface having a thickness less than said substantially constant width separating said pair of substantially parallel spaced-apart side walls;
   ii) a first pair of opposing surfaces extending upwardly from said rectangular-shaped bottom surface and tapered toward said rectangular-shaped bottom surface;
   iii) a second pair of opposing surfaces extending upwardly from said rectangular-shaped bottom surface; and
   iv) a projection extending downwardly from a central portion of said rectangular-shaped bottom surface and formed by removing material from said screw driver flat blade tip, said projection comprising a first pair of opposing surfaces which are continuous and coplanar with said first pair of opposing surfaces of said screw driver flat blade tip, a free tip, a second pair of opposing surfaces tapering toward said free tip, and a square lateral cross-section adjacent to and forming four shoulders with said rectangular-shaped bottom surface, said square lateral cross-section having a diagonal length equal to or less than said diameter of said blind bore;

wherein said screw driver flat blade tip releasably engages said head of said screw in a manner so as to prevent said screw driver flat blade tip from sliding off said head as said screw driver flat blade tip drives said screw.

* * * * *